(12) United States Patent
Dorris, III et al.

(10) Patent No.: US 6,308,898 B1
(45) Date of Patent: Oct. 30, 2001

(54) APPARATUS AND METHODS FOR ACTIVE FLOW CONTROL OF A NOZZLE EXHAUST PLUME

(75) Inventors: John Dorris, III, Cypress; David Michael Smith, Santa Ana, both of CA (US); David Espineli Parekh, Alpharetta, GA (US); Valdis Kibens, St. Charles, MO (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/332,268

(22) Filed: Jun. 11, 1999

(51) Int. Cl.[7] .................................. F02K 1/00; F02K 3/04
(52) U.S. Cl. ...................... 239/265.17; 60/204; 60/264; 60/271
(58) Field of Search .............................. 60/204, 262, 264, 60/271; 239/127, 265.17, 265.23

(56) References Cited

U.S. PATENT DOCUMENTS

| | | | |
|---|---|---|---|
| 2,886,946 | * | 5/1959 | Parker ..................... 239/265.17 |
| 2,943,821 | | 7/1960 | Wetherbee, Jr. . |
| 3,121,312 | | 2/1964 | Hopper . |
| 3,204,405 | * | 9/1965 | Warren et al. ..................... 60/204 |
| 3,420,060 | | 1/1969 | Ostroff et al. . |
| 3,698,642 | | 10/1972 | McCullough . |
| 5,261,227 | | 11/1993 | Griffin, III . |
| 5,664,415 | | 9/1997 | Terrier . |
| 5,833,433 | | 11/1998 | May et al. . |

FOREIGN PATENT DOCUMENTS

| | | |
|---|---|---|
| 323712 A | 9/1957 | (CH) . |
| 1456926 A | 1/1967 | (FR) . |
| 749560 A | 5/1956 | (GB) . |
| 1134996 A | 11/1968 | (GB) . |
| 2 191 606 A | 12/1987 | (GB) . |

* cited by examiner

Primary Examiner—Charles G. Freay
(74) Attorney, Agent, or Firm—Alston & Bird LLP (57) ABSTRACT

Mixing of a subsonic exhaust plume from a nozzle is induced and enhanced, and shaping of the plume is controlled, by periodic pulsed jets of fluid injected into the plume from two or more locations spaced circumferentially about the plume. The jets are pulsed out of phase relative to one another. An active flow control apparatus includes at least first and second pulsed jet nozzles circumferentially spaced apart about the exhaust plume near an exit plane of the exhaust nozzle, and a pulse generator operable to supply periodic pulses of fluid to each of the pulsed jet nozzles such that the pulses to each nozzle are out of phase relative to the pulses to the other nozzle or nozzles.

22 Claims, 5 Drawing Sheets

TIME AVERAGED PLUME CENTERLINE TEMPERATURES FOR THE J402

FIG. 4.

J402 PULSED JET MASS FLOW OVER ONE CYCLE

TIME AVERAGED PLUME CENTERLINE TEMPERATURES FOR THE JT8D

JT8D PULSED JET MASS FLOW OVER ONE CYCLE

APPARATUS AND METHODS FOR ACTIVE FLOW CONTROL OF A NOZZLE EXHAUST PLUME

FIELD OF THE INVENTION

The invention relates to active flow control of nozzle exhaust plumes and, more particularly, to methods and apparatus for actively controlling behavior of an exhaust plume from a subsonic nozzle in order to enhance mixing within the plume and/or control the cross-sectional shape of the plume.

BACKGROUND OF THE INVENTION

Exhausts from turbojet and turbofan engines are very hot and noisy. The hot exhaust plume from an engine nozzle can create a number of problems. Where the engine is so positioned relative to the airframe that the exhaust plume impinges on parts of the airframe, the hot exhaust can cause undesirable temperature-induced effects on the material properties of the impinged parts. As a result, the impinged parts may have to be constructed of a material capable of tolerating high temperatures, such as titanium, which can lead to increased cost of the airframe. In some cases, even such high-temperature materials may not be adequate to insure sufficient structural strength at the elevated temperatures caused by impingement of the exhaust gases, and thus steps must be taken to prevent impingement or to mitigate the effect of impingement.

A number of different approaches have been used in turbofan-powered aircraft in an attempt to prevent impingement or to mitigate the effect of impingement of hot core exhaust gases on airframe surfaces. One attempted solution has been to forcibly mix the hot core nozzle exhaust with relatively lower-temperature fan bypass air prior to exhausting the mixed exhaust stream out the back end of the engine, so that the resulting exhaust stream has a lower temperature. This approach requires a long, costly, and heavy bypass duct nacelle configuration in order to accommodate the mixing structure that joins and mixes the core stream with the bypass stream. A further disadvantage of this approach is that substantial losses in efficiency occur in the course of mixing the two streams, and because the streams are always mixed before being exhausted, these losses occur during all parts of an engine mission cycle, even though the exhaust gas temperature-induced problems being solved may occur during only some parts of a mission cycle such as ground and takeoff operations. Another disadvantage of this approach is that during activation of the engine fan reverser, the hot core exhaust is not mixed with fan bypass air, and thus any temperature-induced problems during fan reverser operation would not be solved.

Another attempted solution to the exhaust plume temperature problem has been to attempt to prevent impingement by use of a core exhaust thrust reverser that can be deployed when desired so as to redirect the core exhaust plume outwardly and forward. This approach has been used, for example, in cases where the hot core exhaust causes its most severe problems during activation of the engine fan thrust reverser. The core reverser hardware is costly and heavy, and requires frequent inspection and maintenance. A further shortcoming of this approach is that the core reverser is activated only during reverse-thrust operation, and thus exhaust temperature-induced problems during forward-thrust operations are not solved. Additionally, the reversed core exhaust can still impinge on airframe surfaces and cause its own temperature-induced problems. Furthermore, as with all variable-geometry reverser devices, the core exhaust thrust reverser raises safety and reliability concerns in terms of accidental deployment, failure to deploy, and/or failure to stow after deployment.

SUMMARY OF THE INVENTION

The above needs are met and other advantages are achieved by the present invention, which provides methods and apparatus for inducing and enhancing mixing of an exhaust plume and/or for controlling the shape of the plume, wherein the mechanism responsible for mixing and/or shaping can readily be activated when needed and deactivated when not needed. The apparatus does not require any costly and heavy components. The mixing of the exhaust plume occurs external to and downstream of the exhaust nozzle, and thus does not depend on mixer hardware for internally mixing bypass and core streams. Thus, the invention alleviates the problem of continuous efficiency degradation caused by conventional forced mixing of bypass and core streams, and substantially eliminates the significant cost and weight penalties associated with long duct nacelles, bypass-core mixing devices, and core reversers. A further benefit of the invention is that if the apparatus is accidentally activated or fails to deactivate, the only undesirable consequence is a small degradation in engine efficiency, and hence the invention facilitates improved safety and reliability of the engine system.

To these ends, the invention in one embodiment provides a method for inducing mixing of an exhaust plume from a nozzle, comprising directing periodically recurring pulsed jets of fluid inwardly into the exhaust plume from at least two locations that are circumferentially spaced apart about the plume, with pulses directed from one of the locations being out of phase relative to pulses directed from the other location. The pulsed jets cause excitation of the exhaust plume shear layer, which results in a flow instability occurring about one to three nozzle diameters downstream of the nozzle exit plane. This flow instability causes the plume to "flap" back and forth, thereby creating mixing of fluid in the plume with fluid outside of the plume. The behavior of the plume can also be controlled by suitable location of the pulsed jets so as to control the cross-sectional shape of the plume. The mixing of the plume results in a decrease in the average and peak temperatures in the plume downstream of the nozzle exit. Based on CFD model predictions and experimental testing with two different engine nozzle configurations, the invention enables exhaust temperatures downstream of the nozzle to be reduced by up to 50 percent or more.

The pulsed jets in one preferred embodiment of the invention are arranged such that they are directed into the exhaust plume from diametrically opposite locations, i.e., circumferentially spaced about 180° apart, and are timed such that the pulses from one side of the plume are approximately 180° out of phase relative to the pulses from the opposite side. The pulsed jets can be positioned either at or slightly upstream or downstream of the exit plane of the nozzle. In one preferred embodiment of the invention, each of the pulsed jets is elongated in a circumferential direction of the nozzle. For example, each of the pulsed jets advantageously covers about 90° of circumferential arc.

As noted above, the invention can also enable the shape of the exhaust plume to be controlled. More particularly, the pulsed jets cause an alteration in the shape of the cross-section of the exhaust plume, tending to "spread" or elongate the plume along an axis whose orientation is dictated by the circumferential location of the pulsed jets. Thus, the orientation of the plume spreading can be controlled by suitable location of the pulsed jets. For example, where the pulsed jets are located at 6 o'clock and 12 o'clock circumferential positions, the plume downstream of the nozzle exit tends to spread along a horizontal axis passing through 3 o'clock and 9 o'clock positions. This plume spreading can be advantageous in some applications. For example, for "powered lift" operation where the nozzle exhaust gases flow over wing flaps to enhance the lift performance of the wings, the spreading of the exhaust plume can result in increased flap area wetted by the plume, thus improving the powered lift performance. Moreover, since the plume mixing results in lower temperature of the flow over the flaps, the flaps can potentially be constructed of lower-cost and lighter-weight materials than those that may be required in order to tolerate the higher-temperature exhaust gases from a nozzle not employing the present invention.

In another preferred embodiment of the invention, a rotational motion of the plume can be induced by locating pulsed jets in at least three locations spaced circumferentially about the plume, and sequentially pulsing the jets. The rotational motion of the plume can be advantageous in terms of enhanced mixing and can also yield an effectively wider plume that may be beneficial for powered lift or other purposes.

In accordance with a further aspect of the invention, an active flow control apparatus for enhancing mixing of a nozzle exhaust plume in one embodiment comprises at least first and second pulsed jet nozzles adapted to be disposed proximate an exit plane of the primary nozzle and circumferentially spaced from each other near a radially outermost boundary of the exhaust plume, the pulsed jet nozzles being constructed and arranged to direct pulsed jets of fluid inwardly into the exhaust plume. The apparatus further includes a fluid supply for supplying fluid to the pulsed jet nozzles, and a pulse generator connected between the fluid supply and the pulsed jet nozzles. The pulse generator is operable to supply periodic first pulses of fluid to the first pulsed jet nozzle and periodic second pulses of fluid to the second pulsed jet nozzle such that the first and second pulses are out of phase with each other.

The pulsed jet nozzles can be located inside the primary nozzle at or upstream of the nozzle exit plane. Alternatively, the pulsed jet nozzles can be located outside the primary nozzle downstream of the nozzle exit plane.

The pulse generator advantageously is operable to pulse the fluid at a frequency yielding a Strouhal number of about 0.1–0.5, and more preferably about 0.2–0.4, based on the pulse frequency and the diameter and velocity of the plume at the nozzle exit plane. The pulsed jets preferably have a total mass flow that represents about 0.1–10 percent of the mass flow of the exhaust plume, and more preferably about 0.1–3 percent. The pulse generator can be any device capable of creating fluid pulses of the desired frequency and flow. For example, a rotating siren or fluidic valve can be used. Depending on the application, it may be advantageous to employ a variable-frequency pulse generator permitting selection of the pulse frequency so that the degree of excitation and mixing can be selectably varied.

In a turbofan or turbojet engine, the fluid supply for the pulsed jets advantageously can be obtained by taking bleed air from the fan or core. Preferably, a shut-off valve is interposed between the fluid supply and the pulse generator to enable the pulsed jets to be selectively turned on or off.

The invention thus provides an improved flow control apparatus for a nozzle that can be made light in weight and relatively low in cost relative to conventional mixer and core reverser devices, can be activated during any phase of engine operation and can be turned off when not needed, does not pose any threat to engine or aircraft safety should the apparatus fail, and whose function can be tailored to the particular engine or flow condition to optimize mixing and/or shaping of the exhaust plume.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 9 is a side view similar to FIG. 8, but with the active flow control apparatus of the invention turned on;

FIG. 11 is a cross-sectional view similar to FIG. 10, but with the active flow control apparatus turned on.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
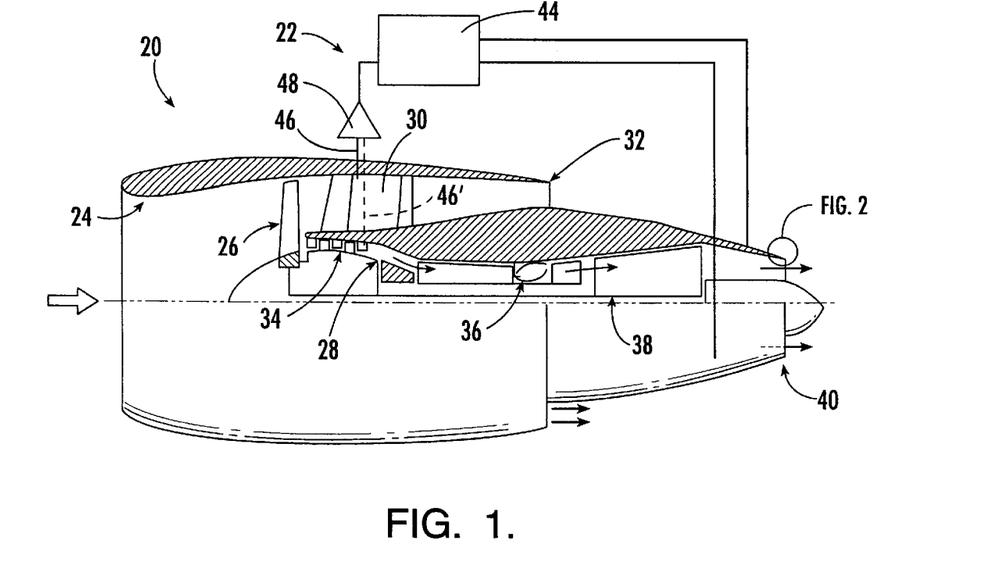
FIG. 1 is a schematic representation of a turbofan engine having a pulsed jet active flow control apparatus in accordance with a preferred embodiment of the invention.
Figure 2:
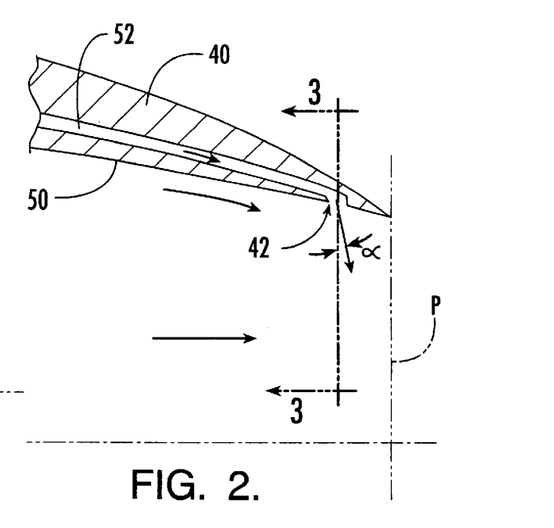
FIG. 2 is an enlarged fragmentary sectioned side elevation of an exit lip portion of a nozzle wall incorporating a pulsed jet nozzle in accordance with a preferred embodiment of the invention.
Figure 3:
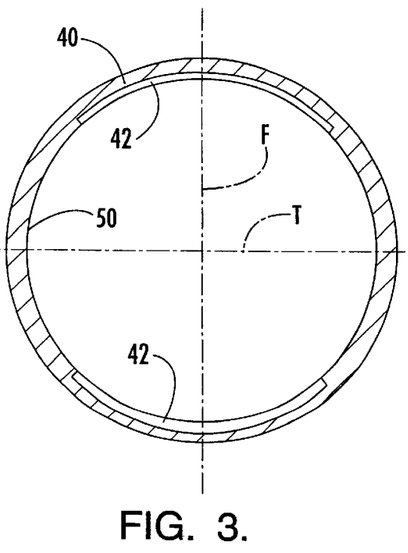
FIG. 3 is a sectioned end elevation of an exit lip portion of a nozzle wall incorporating a pair of circumferentially elongated pulsed jet nozzles in accordance with a preferred embodiment of the invention.

With reference to FIG. 1, a turbofan engine 20 is depicted in schematic fashion incorporating an active nozzle flow control apparatus 22 in accordance with a preferred embodiment of the invention, and FIGS. 2 and 3 depict in greater detail a nozzle lip portion of the engine core exhaust nozzle. The engine 20, except for the inclusion of the nozzle flow control apparatus 22, is otherwise a conventional turbofan engine having an inlet 24, a fan 26 for compressing air ingested through the inlet 24, a core engine 28 through which a portion of the air compressed by the fan is passed, a bypass duct 30 through which the remainder of the air compressed by the fan is passed such that the air bypasses the core engine, and a fan nozzle 32 for exhausting the fan bypass air. The core engine 28 includes at least one compressor 34 for further compressing air received from the fan 26, a combustion section 36 for mixing compressed air from the compressor with fuel and for burning the resulting mixture so as to create hot combustion gases, a turbine section 38 for expanding the hot combustion gases so as to extract power from the stream of hot gases for driving the compressor 34 and fan 26, and a core exhaust nozzle 40 for exhausting the hot gases out the rear end of the engine to create an exhaust plume. The compressive components of the engine, including the fan 26 and the compressor 34, are collectively referred to herein as the compressive section. It will be appreciated that the components of the engine 20 depicted in FIG. 1 are merely for illustrative purposes, and that the present invention is applicable to any type of jet engine that exhausts gases from a nozzle, including turbofan and turbojet engines.

The exhaust plume from the nozzle of a jet engine, such as the core nozzle 40, tends to be hot and noisy. As previously noted, the high temperature of the gases in the exhaust plume can give rise to various problems including undesirable thermally induced changes in aircraft structures that are impinged by the plume. Ground personnel loading and unloading cargo from the aircraft aft of the engine can also be affected by the exhaust plume. Accordingly, for these and other reasons, it is desirable to reduce the temperature of the exhaust plume.

In accordance with the present invention, mixing of the exhaust plume with fluid outside the plume is induced and enhanced by a unique active flow control apparatus and method, and this mixing can result in substantial reductions in plume temperature. It has been discovered that an instability of the shear layer of an exhaust plume can be caused by injecting pulsed jets of fluid inwardly into the plume at two or more locations spaced circumferentially about the plume, and by timing the pulsed jets such that the pulses are out of phase at the various locations. The resulting instability of the shear layer causes the plume to "flap" rather than proceeding straight and parallel to the nozzle centerline, and this flapping motion of the plume causes mixing of fluid internally within the plume as well as mixing of fluid within the plume with fluid outside the plume.

As an illustrative example of an active flow control apparatus in accordance with the present invention, reference is made to FIGS. 1–3, which depict a flow control apparatus 22 that is operable for creating a back-and-forth flapping motion of the exhaust plume from the core nozzle 40 of the engine. The flow control apparatus 22 comprises a pair of pulsed jet nozzles 42 positioned slightly upstream of the exit plane P of the nozzle and operable for injecting fluid inwardly into the exhaust plume, a pulse generator 44 operable for supplying periodic pulses of fluid to the pulsed jet nozzles 42 such that the pulses are out of phase with each other, and a bleed conduit 46 that is coupled with the fan bypass duct 30 so as to bleed a portion of the fan bypass air from the duct 30 and supply the bleed air to the pulse generator 44. Alternatively, as shown by the dashed line in FIG. 1, a bleed conduit 46' can be coupled with the core compressor 34 so as to bleed a portion of the core compressor air and supply this bleed air to the pulse generator 44. The flow control apparatus 22 preferably also includes a shut-off valve 48 arranged in or coupled with the bleed conduit 46 or 46' so that the bleed flow to the pulse generator 44 can be stopped when it is desired to turn off the active flow control of the core nozzle flow.

In the embodiment of the invention depicted in FIGS. 1–3, the pulsed jet nozzles 42 are formed as circumferentially elongated slots (best seen in FIG. 3) in the side wall 50 of the core nozzle 40. The slot nozzles 42 open into the main flow path of the nozzle 40 just upstream of the exit plane P, and are supplied with air by passages 52 formed in the nozzle side wall 50. The two nozzles 42 are located on diametrically opposite sides of the nozzle 40, and each nozzle 42 extends circumferentially over an arc of about 90°. Where the pulsed jet nozzles are located upstream of the nozzle exit plane, it is preferable to place them as close to the nozzle exit plane as possible. Satisfactory results can be obtained with the pulsed jet nozzles located as much as one-tenth of a nozzle diameter upstream of the nozzle exit plane.

A computational fluid dynamics (CFD) model described in "A Three Dimensional Zonal Navier-Stokes Code for Subsonic Through Hypersonic Propulsion Flowfields", AIAA Paper No. 88-2830 (1988), which is incorporated herein by reference, was used to calculate the flowfield from an exhaust nozzle both with and without pulsed jet excitation of the exhaust plume, for two different engine configurations. Additionally, both of these engines were operated on a test stand at conditions similar to those modeled by the CFD model and measurements of plume conditions were taken for comparison with the model-predicted results.

Figure 5:
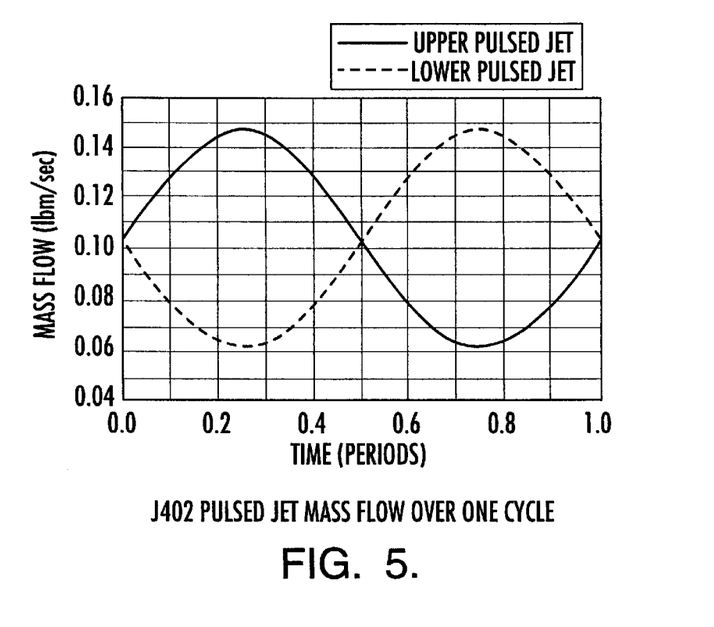
FIG. 5 is a plot showing pulsed jet mass flow corresponding to the results of FIG. 4.

One of the engines modeled and tested was a J402-CA-700 sub-scale turbojet engine having a nozzle diameter of about 6 inches. An annular ring housing upper and lower pulsed jet nozzles was mounted just downstream of the nozzle exit plane of the nozzle of the J402. Each of the pulsed jet nozzles had an axial width of 0.063 inch and a circumferential extent of 90° of arc. The upper and lower pulsed jet nozzles were supplied with air in a generally harmonic fashion 180° out of phase with each other. FIG. 5 shows the pulsed jet mass flows for the upper and lower pulsed jet nozzles over one cycle as modeled in the CFD model. The combined mass flow for both of the pulsed jets nozzles was 0.21 $lb_m$/sec, representing about 3 percent of the engine nozzle flow. From the experimental measurements taken, it was not possible to deduce time-varying exit Mach number for the pulsed jets, but assuming a constant static pressure at the pulsed jet nozzle exit, an average exit Mach number of about 0.66 was calculated. The pulsed jets were pulsed at a frequency of 343 Hz, yielding a Strouhal number of 0.13 based on nozzle diameter and primary jet velocity.

Figure 7:
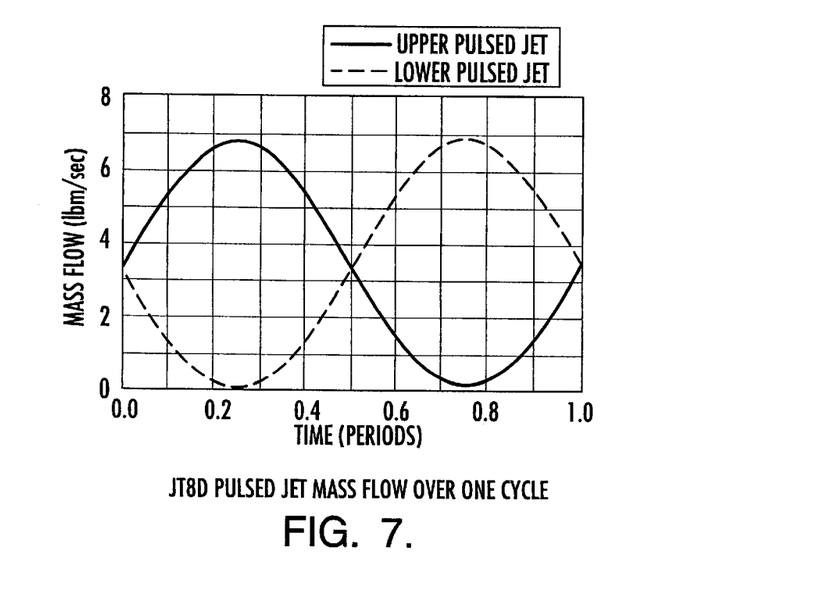
FIG. 7 is a plot showing pulsed jet mass flow corresponding to the results of FIG. 6

The other engine modeled and tested was a Pratt & Whitney JT8D-15 turbofan engine having a core nozzle diameter of about 30 inches. Upper and lower pulsed jet nozzles were located on the internal wall of the core nozzle about 2 inches upstream of the nozzle exit plane. Each of the pulsed jet nozzles had an axial width of 0.925 inch and a circumferential extent of 90° of arc. The upper and lower pulsed jet nozzles were supplied with air in a generally harmonic fashion 180° out of phase with each other. FIG. 7 shows the pulsed jet mass flows for the upper and lower pulsed jet nozzles as modeled in the CFD model. The combined mass flow for both of the pulsed jets nozzles was 6.53 lb$_m$/sec, representing about 3 percent of the engine core nozzle flow. Again, it was not possible to deduce time-varying exit Mach number for the pulsed jets based on the experimental results, but assuming a constant static pressure at the pulsed jet nozzle exit, an average exit Mach number of about 0.58 was calculated. The pulsed jets were pulsed at a frequency of 120 Hz, yielding a Strouhal number of 0.33 based on nozzle diameter and primary jet velocity.

Figure 4:
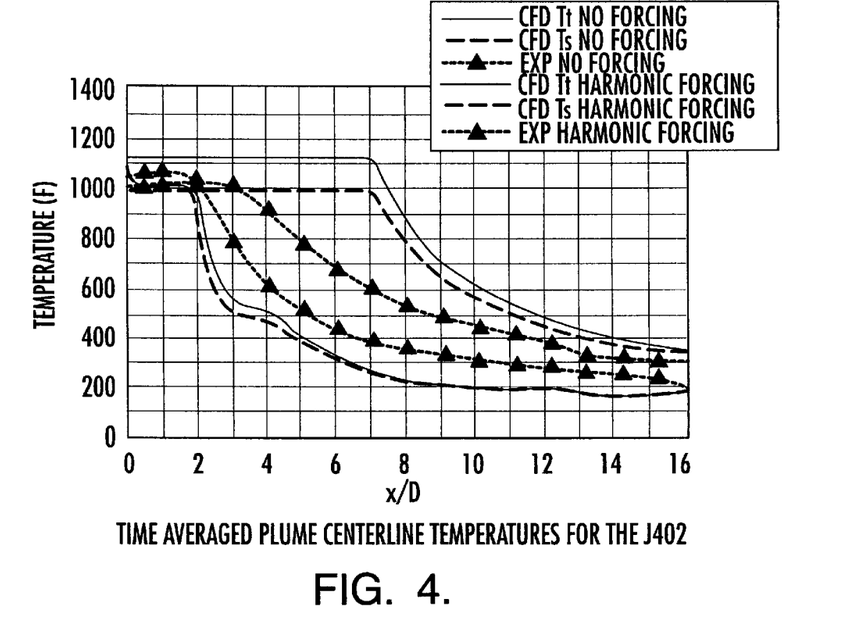
FIG. 4 is a plot comparing time-averaged plume centerline temperatures (total and static) with and without pulsed jet excitation of the plume for a sub-scale turbojet engine, showing both model-calculated and experimental results.

FIG. 4 is a plot comparing time-averaged plume centerline temperatures (total and static) with and without pulsed jet excitation of the plume for the J402 engine, showing both model-calculated and experimental results. Beginning at about two nozzles diameters downstream of the nozzle exit, the computational results predict a substantial temperature reduction along the plume centerline. At three nozzle diameters downstream of the nozzle exit, the CFD model predicts the pulsed jets to produce a reduction in total temperature of about 550° F. and a static temperature reduction of almost 500° F. The experimental results at three nozzle diameters downstream show a temperature reduction of slightly more than 200° F. At ten nozzle diameters downstream, the CFD model predicts a temperature reduction of about 400° F., and the measurements show a reduction of about 150° F. The CFD model can be expected to over-predict the temperature reduction because of the simplification of the geometry and flow conditions, particularly those of the pulsed jets.

Figure 6:
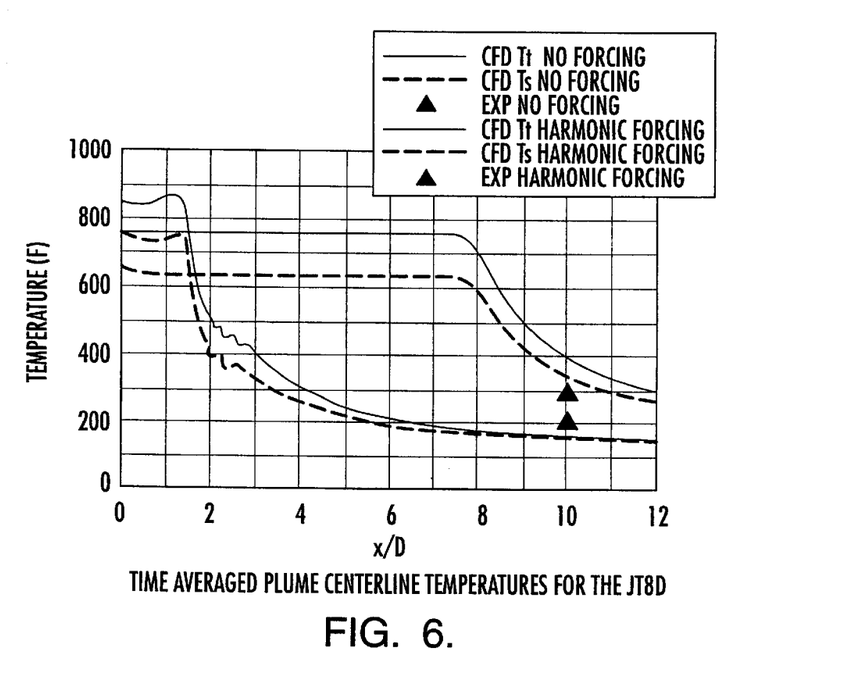
FIG. 6 is a plot comparing time-averaged plume centerline temperatures (total and static) with and without pulsed jet excitation of the plume for a full-scale turbofan engine, showing both model-calculated and experimental results.

FIG. 6 shows similar results of time-averaged plume centerline temperatures for the JT8D engine. It will be noted that from the nozzle exit to about one-and-one-half nozzle diameters downstream thereof, the total and static temperature are predicted to be increased when pulsed jet excitation is employed. This effect is due to the air for the pulsed jets being bled from the core engine. However, beginning at about two nozzles diameters downstream of the nozzle exit, the computational results predict a substantial temperature reduction along the plume centerline. At five nozzle diameters downstream, the model predicts a static temperature reduction of about 400° F.; at ten nozzle diameters downstream, the model predicts about a 200° F. reduction in static temperature. The experimental results at ten nozzle diameters downstream show a temperature reduction of almost 100° F.

Figure 8:
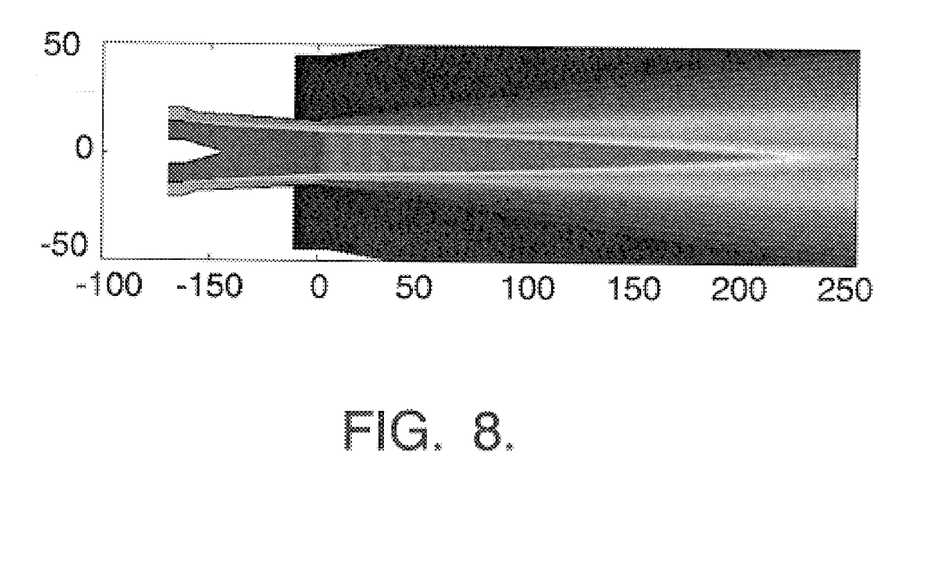
FIG. 8 is a side view of a plume from the JT8D engine taken at one instant in time with a thermal imaging system, showing contours of static temperature when the active flow control apparatus of the invention was turned off.
Figure 9:
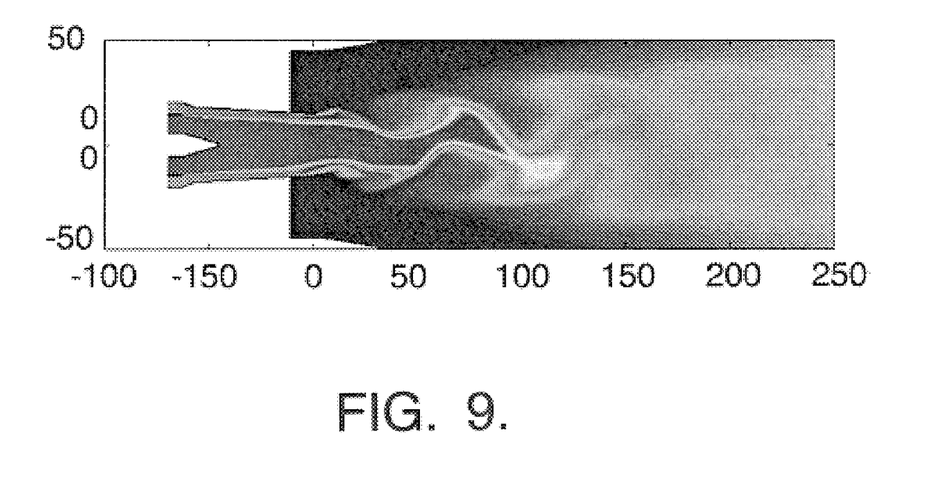

The effects of the excitation of the plume by the pulsed jets in the JT8D engine test can be seen even more vividly by examining static temperature contour plots of the plume measured by a thermal imaging system. FIG. 8 is a side view of a plume from the JT8D engine taken at one instant in time, showing contours of static temperature when the active flow control apparatus of the invention was turned off. FIG. 9 is a similar plot taken with the active flow control apparatus turned on. In FIGS. 8 and 9, the plume is viewed along a direction normal to a "flapping" plane F (FIG. 3) that bisects each of the upper and lower pulsed jet nozzles into two 45° segments. It can be seen that excitation of the plume by the pulsed jets causes the plume to "flap" back and forth along the direction of the flapping plane.

Figure 10:
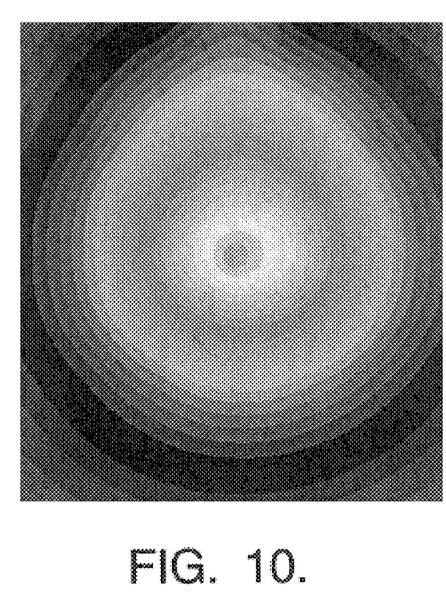
FIG. 10 is a cross-sectional view of a plume from the JT8D engine taken at one instant in time with a thermal imaging system, showing contours of static temperature when the active flow control apparatus of the invention was turned off.
Figure 11:
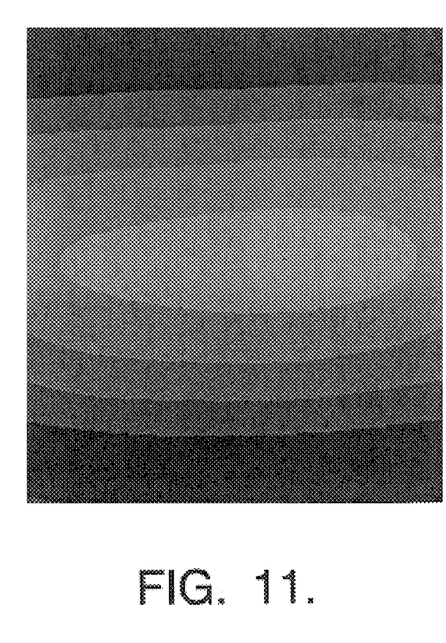

FIGS. 10 and 11 show cross-sectional plots of static temperatures for the JT8D exhaust plume with and without pulsed jet excitation. FIG. 11 shows that the excitation of the plume by the pulsed jets causes the plume to be spread out along the direction of a transverse plane T (FIG. 3) that is normal to the flapping plane. Thus, the shape of the exhaust plume can be controlled by pulsed jet excitation. For example, the direction along which the plume is spread can be controlled by suitable location of the pulsed jet nozzles.

It has also been found through additional testing and CFD simulations that the pulsed jet nozzles need not be diametrically opposite each other and need not be pulsed a full 180° out of phase in order to achieve improved mixing and temperature reduction of the exhaust plume. For example, the center-to-center circumferential spacing between pulsed jet nozzles can be anywhere from about 90° up to 180°. Additionally, more than two pulsed jet nozzles can be spaced about the circumference of the plume for achieving other effects. For instance, three or more pulsed jet nozzles can be circumferentially spaced about the plume and the nozzles can be sequentially pulsed in a rotational fashion so as to induce a rotational motion of the plume. Alternatively, four pulsed jet nozzles can be spaced 90° apart. Adjacent pairs of jets can be pulsed in unison, the two pairs being pulsed about 180° out of phase from each other. Such an arrangement can enhance mixing of the plume while preserving a round shape of the plume.

The pulse generator 44 for creating the periodic fluid pulsing can be any device that is capable of creating pulses at the desired mass flow and frequency. Examples of suitable pulse generators include rotating siren-type devices and fluidic valve-type devices. In some applications, it may be advantageous to be able to selectively vary the frequency of fluid pulsing, such as by varying the rotational speed of a rotating siren-type pulse generator. For example, various degrees of excitation and mixing can be produced by varying the pulse frequency, so it may be desirable to be able to vary the pulse frequency in order to produce an optimum amount of mixing at any given flow condition. Furthermore, laboratory testing has indicated that exhaust noise can be reduced by suitable choice of pulse frequency and mass flow.

Many modifications and other embodiments of the invention will come to mind to one skilled in the art to which this invention pertains having the benefit of the teachings presented in the foregoing descriptions and the associated drawings. For example, although the illustrated embodiments of the invention employ pulsed jet nozzles each of which is formed as a single continuous nozzle, alternatively a pulsed jet nozzle can be formed as a plurality of individual nozzles located side-by-side in the circumferential direction with all of the individual nozzles being pulsed together. Other variations on the disclosed embodiments can also be made within the scope of the invention. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for enhancing mixing of an exhaust plume from a nozzle, comprising:

directing periodically recurring pulsed jets of fluid inwardly into the exhaust plume from at least two locations spaced circumferentially about the plume, with pulses directed from said locations being out of phase relative to one another, the jets being pulsed at a frequency selected based on flow conditions of the plume so as to cause instability of a shear layer of the plume downstream from an exit plane of the nozzle and thereby cause the plume to undergo a back-and-forth flapping motion that enhances mixing.

2. The method of claim 1, wherein two pulsed jets are located on diametrically opposite sides of the plume and are pulsed approximately 180° out of phase from each other.

3. The method of claim 1, wherein the pulsed jets are directed into the plume from locations proximate an exit plane of the nozzle.

4. The method of claim 1, wherein each of the pulsed jets is elongated in a circumferential direction of the nozzle.

5. The method of claim 4, wherein each of the pulsed jets covers about 90° of circumferential arc.

6. The method of claim 1, wherein the pulsed jets have a transonic velocity.

7. The method of claim 1, wherein the pulsed jets are pulsed at a Strouhal number of about 0.1–0.5.

8. The method of claim 1, wherein the pulsed jets have a total average mass flow that represents about 0.1–10 percent of the mass flow of the exhaust plume.

9. The method of claim 1, wherein two pulsed jets are circumferentially spaced about 90°–180° apart on center and are pulsed out of phase with each other.

10. An active flow control apparatus for enhancing mixing of a nozzle exhaust plume downstream of an exit plane of a primary nozzle, comprising:
- at least first and second pulsed jet nozzles circumferentially spaced apart near a radially outermost boundary of the exhaust plume, the pulsed jet nozzles being constructed and arranged to direct pulsed jets of fluid inwardly into the exhaust plume;
- a pulsed jet fluid supply for supplying fluid to the pulsed jet nozzles; and
- a pulse generator connected between the pulsed jet fluid supply and the pulsed jet nozzles, the pulse generator being operable to supply periodic first pulses of fluid to the first pulsed jet nozzle and periodic second pulses of fluid to the second pulsed jet nozzle such that the first and second pulses are out of phase with each other.

11. The active flow control apparatus of claim 10, wherein the pulsed jet nozzles are adapted to be located inside the primary nozzle at or upstream of the nozzle exit plane.

12. The active flow control apparatus of claim 10, wherein the first and second pulsed jet nozzles are circumferentially spaced apart about 90°–180° on center.

13. The active flow control apparatus of claim 10, wherein the first and second pulsed jet nozzles are elongated in the circumferential direction.

14. The active flow control apparatus of claim 13, wherein each of the first and second pulsed jet nozzles has a circumferential extent of about 90° of arc.

15. The active flow control apparatus of claim 13, wherein each of the pulsed jet nozzles comprises a slot formed through a wall of the primary nozzle and opening into the main gas flow upstream of the nozzle exit plane.

16. The active flow control apparatus of claim 10, wherein the pulse generator is operable to create first and second pulses that are about 180° out of phase.

17. The active flow control apparatus of claim 10, wherein the pulse generator comprises a variable-frequency pulse generator enabling the frequency of the pulses to be selectably varied.

18. An active flow control apparatus for enhancing mixing of a nozzle exhaust plume downstream of an exit plane of a primary nozzle, comprising:
- at least first and second pulsed jet nozzles circumferentially spaced apart near a radially outermost boundary of the exhaust plume, the pulsed jet nozzles being constructed and arranged to direct pulsed jets of fluid inwardly into the exhaust plume;
- a pulsed jet fluid supply for supplying fluid to the pulsed jet nozzles;
- a pulse generator connected between the pulsed jet fluid supply and the pulsed jet nozzles, the pulse generator being operable to supply periodic first pulses of fluid to the first pulsed jet nozzle and periodic second pulses of fluid to the second pulsed jet nozzle such that the first and second pulses are out of phase with each other; and
- a shut-off valve coupled between the fluid supply and the pulse generator.

19. An aircraft jet engine having an actively controlled nozzle, comprising:
- a compressive section operable to compress air ingested by the engine, a combustion section operable to mix at least part of the compressed air with fuel and burn the mixture to produce hot combustion gases, and a turbine section operable to expand the hot combustion gases and to drive the compressive section;
- an exhaust nozzle arranged to receive expanded hot combustion gases from the turbine section and operable to exhaust the expanded hot combustion gases out a rear end of the engine to create an exhaust plume;
- at least first and second pulsed jet nozzles circumferentially spaced apart near a radially outermost boundary of the exhaust plume, the pulsed jet nozzles being constructed and arranged to direct pulsed jets of fluid inwardly into the exhaust plume;
- a bleed conduit coupled with the compressive section for bleeding a portion of the compressed air therefrom; and
- a pulse generator arranged to receive bleed air from the bleed conduit, the pulse generator being operable to supply periodic first pulses of air to the first pulsed jet nozzle and periodic second pulses of air to the second pulsed jet nozzle such that the first and second pulses are out of phase with each other.

20. The aircraft engine of claim 19, wherein the compressive section includes a core compressor arranged to supply compressed air to the combustion section, a fan operable to compress air, and a bypass duct arranged to pass at least a portion of air compressed by the fan so as to bypass the combustion and turbine sections, and wherein the bleed conduit is coupled to one of the core compressor and the fan for bleeding compressed air therefrom.

21. An aircraft jet engine having an actively controlled nozzle, comprising:
- a compressive section operable to compress air ingested by the engine, a combustion section operable to mix at least part of the compressed air with fuel and burn the mixture to produce hot combustion gases, and a turbine section operable to expand the hot combustion gases and to drive the compressive section;
- an exhaust nozzle arranged to receive expanded hot combustion gases from the turbine section and operable to exhaust the expanded hot combustion gases out a rear end of the engine to create an exhaust plume;
- at least first and second pulsed jet nozzles circumferentially spaced apart near a radially outermost boundary of the exhaust plume, the pulsed jet nozzles being constructed and arranged to direct pulsed jets of fluid inwardly into the exhaust plume;
- a bleed conduit coupled with the compressive section for bleeding a portion of the compressed air therefrom;
- a pulse generator arranged to receive bleed air from the bleed conduit, the pulse generator being operable to supply periodic first pulses of air to the first pulsed jet nozzle and periodic second pulses of air to the second pulsed jet nozzle such that the first and second pulses are out of phase with each other; and
- a shut-off valve disposed between the bleed conduit and the pulse generator for interrupting supply of bleed air to the pulse generator.

22. A method for promoting mixing between a subsonic nozzle exhaust plume and ambient air into which the plume exhausts, comprising:

directing periodic pulsed jets of fluid inwardly into the plume from at least two locations spaced circumferentially about the plume and located proximate an exit plane of the nozzle, the jets directed from said locations being out of phase relative to one another and being pulsed at a frequency selected so as to cause instability of a shear layer of the plume downstream from the exit plane of the nozzle and thereby cause the plume to undergo a back-and-forth flapping motion that promotes mixing between the plume and the ambient air.

* * * * *